United States Patent
Klomp et al.

(10) Patent No.: US 12,134,290 B2
(45) Date of Patent: Nov. 5, 2024

(54) COMPUTER PROGRAM, COMMUNICATION CIRCUIT, VEHICLE, TRAILER, AND METHODS FOR COMMUNICATION BETWEEN A VEHICLE AND A TRAILER

(71) Applicant: VOLKSWAGEN AKTIENGESELLSCHAFT, Wolfsburg (DE)

(72) Inventors: Sven Klomp, Uetze / Dollbergen (DE); Philipp Hüger, Rühen (DE); Steffen Frerk, Braunschweig (DE); Hendrik-Jörn Günther, Peine (DE)

(73) Assignee: VOLKSWAGEN AKTIENGESELLSCHAFT (DE)

(*) Notice: Subject to any disclaimer, the term of this patent is extended or adjusted under 35 U.S.C. 154(b) by 284 days.

(21) Appl. No.: 17/806,525

(22) Filed: Jun. 13, 2022

(65) Prior Publication Data
US 2022/0402321 A1   Dec. 22, 2022

(30) Foreign Application Priority Data
Jun. 16, 2021   (EP) .................................. 21179912

(51) Int. Cl.
*B60D 1/62* (2006.01)

(52) U.S. Cl.
CPC ..................... *B60D 1/62* (2013.01)

(58) Field of Classification Search
CPC ............ B60D 1/62; H04W 4/48; H04W 4/12; H04W 4/40; H04W 4/46
USPC ........................................................ 340/431
See application file for complete search history.

(56) References Cited

U.S. PATENT DOCUMENTS

| | | |
|---|---|---|
| 7,574,606 B1 | 8/2009 | Fan et al. |
| 10,126,755 B1 | 11/2018 | Lavi et al. |
| 10,259,390 B2 | 4/2019 | Zhang et al. |
| 11,702,109 B2 | 7/2023 | Pfadler et al. |
| 2002/0030590 A1* | 3/2002 | Dieckmann .............. B60D 1/62 340/475 |
| 2006/0250224 A1 | 11/2006 | Steffel et al. |
| 2018/0365909 A1 | 12/2018 | Cheng et al. |
| 2020/0184412 A1* | 6/2020 | Champa .................. H04W 4/40 |

(Continued)

FOREIGN PATENT DOCUMENTS

| | | |
|---|---|---|
| CN | 109278672 A | 1/2019 |
| CN | 112752237 A | 5/2021 |

(Continued)

OTHER PUBLICATIONS

Office Action; European Patent Application No. 21179912.7; Feb. 8, 2024.

(Continued)

*Primary Examiner* — Eric Blount
(74) *Attorney, Agent, or Firm* — Barnes & Thornburg LLP (57) ABSTRACT

A computer program, a communication circuit, a transportation vehicle, a trailer, and methods for communication between a transportation vehicle and a trailer. The method for the transportation vehicle includes receiving a message from one or more traffic participants, determining whether the respective traffic participant is attached to the transportation vehicle using the message, and associating the message to the trailer in response to determining that the respective traffic participant is attached to the transportation vehicle.

10 Claims, 2 Drawing Sheets

(56) References Cited

U.S. PATENT DOCUMENTS

2020/0296779 A1   9/2020  Moghe et al.
2021/0245678 A1   8/2021  Smits

FOREIGN PATENT DOCUMENTS

| | | |
|---|---|---|
| DE | 102015120985 A1 | 6/2016 |
| DE | 102016008030 A1 | 2/2017 |
| DE | 102017111530 A1 | 11/2017 |
| WO | 2004068164 A2 | 8/2004 |
| WO | 2020088855 A1 | 5/2020 |

OTHER PUBLICATIONS

Office Action; Chinese Patent Application No. 202210679518.7; Sep. 7, 2023.
Search Report for European Patent Application No. 21179912.7; Nov. 10, 2021.

\* cited by examiner

COMPUTER PROGRAM, COMMUNICATION CIRCUIT, VEHICLE, TRAILER, AND METHODS FOR COMMUNICATION BETWEEN A VEHICLE AND A TRAILER

PRIORITY CLAIM

This patent application claims priority to European Patent Application No. 21179912.7, filed 16 Jun. 2021, the disclosure of which is incorporated herein by reference in its entirety.

SUMMARY

Illustrative embodiments relate to a computer program, a communication circuit, a transportation vehicle, a trailer, and methods for communication between a transportation vehicle and a trailer. In particular, illustrative embodiments relate to a concept for communication between a trailer and a transportation vehicle for a trailer assist system.

BRIEF DESCRIPTION OF THE DRAWINGS

Disclosed embodiments will be described with reference to the accompanying figures, in which.

DETAILED DESCRIPTION

Trailer assistance systems are systems that support a driver or an at least partially autonomous driving transportation vehicle in maneuvering a transportation vehicle and a trailer attached to the transportation vehicle. In some concepts for trailer assist systems, the driver can define a maximum angle between a driving direction of the transportation vehicle and the trailer and the trailer assist system maneuvers the transportation vehicle such that the maximum angle is not exceeded and collisions of the transportation vehicle and the trailer with surrounding object or transportation vehicles are avoided. For this, the trailer may wirelessly provide the transportation vehicle with messages including sensor data of the environment.

Document DE 10 2016 008 030 A1 proposes a vehicle with a towable object, e.g., a trailer, and a distance warning system for the vehicle. The distance warning system is connected to a distance sensing system of the towable object via a data line for transmitting information of the distance sensing system to the vehicle and evaluating the information.

Document DE 10 2015 120 985 A1 proposes a concept for recognizing a known trailer with a specific parameter for a trailer assist system. For this, it is proposed to transmit an identifier of the vehicle to the vehicle using a wireless transmitter attached to the trailer and determine the parameter by the identifier.

US 2002/030 590 A1 discloses a method for data exchange between a towing vehicle and an attached trailer. The method uses radio contact via transmission/receiving modules contained in the towing vehicle and in the trailer. To recognize that the towing vehicle and the trailer are connected, the transmission/receiving module of the towing vehicle transmits an identification signal, and at the same time, changes the electrical status of a connection line between the towing vehicle and the trailer.

US 2020/296 779 A1 discloses a device of a tractor unit. The device determines that the tractor unit is connected to a trailer via physical cabling. The device sends, via the physical cabling, a powerline communication (PLC) message to the trailer that includes a service set identifier (SSID) and a password for a Wi-Fi transceiver of the tractor unit. The Wi-Fi transceiver of the tractor unit receives an association request sent wirelessly from a Wi-Fi transceiver of the trailer that is based on the sent SSID and password.

In practice, transportation vehicles receive messages from a plurality of traffic participants, e.g., transportation vehicles and/or trailers. However, none of the aforementioned documents provide a concept for identifying a message of a trailer attached to a transportation vehicle, e.g., for the use with a trailer assist system among multiple received messages.

Hence, there is a demand for an improved concept for communication between a transportation vehicle and a trailer.

This demand may be satisfied by the subject-matter of the appended independent and dependent claims.

Disclosed embodiments of the present disclosure are based on the finding that messages from a trailer can be differentiated from messages of other traffic participants by, e.g., their content or time of reception. An idea of the present disclosure is to use such differences of the message to identify messages of the trailer, e.g., for a specific use of them. Another finding is that the motion and position of the trailer correlates with the motion and position of a transportation vehicle towing the trailer. So, one idea of the present disclosure is to include the trailer's position and/or motion in messages of the trailer to identify its messages using the trailer's position and/or motion from the messages. According to another idea, (only) the trailer is prompted to answer through a message in response to a request of the transportation vehicle and the transportation vehicle determines which message is the response to identify the message from the trailer.

Disclosed embodiments provide a method for a transportation vehicle and for communicating with a trailer. The method comprises receiving, from one or more traffic participants, a message. Further, the method comprises determining, using the message, whether the respective traffic participant is attached to the transportation vehicle. The method further comprises associating the message to the trailer if it is determined that the respective traffic participant is attached to the transportation vehicle. This allows the transportation vehicle to distinguish the message from the trailer from messages of other traffic participants, e.g., for identification of the trailer.

Also, the method may comprise using the message associated with the trailer for a trailer assist system of the transportation vehicle. The message, e.g., comprises environmental information (information on the environment of the trailer and/or transportation vehicle) for the use in the trailer assist system. Using the message for a trailer assist may allow maneuvering the trailer safely or at least safer.

The message may indicate a motion and/or a position of the respective traffic participant and determining whether the traffic participant is attached to the transportation vehicle may comprise determining whether the respective traffic participant is attached to the transportation vehicle based on a comparison of the transportation vehicle's and the traffic participant's motion and/or position using the message. In this way, the message from the trailer is distinguished from other traffic participants whose motion and position is uncorrelated or less correlated to the motion and position of transportation vehicle. Messages of some type, e.g., a Collective Perception Message (CPM) or a Cooperative Awareness Message (CAM) comprise information on the position and the motion anyway such that, in favor of resource efficiency, it is not necessary to add further information to the message for association of the message to the trailer.

In some exemplary embodiments, the method further comprises providing the trailer with a request via a wired connection between the transportation vehicle and the trailer. Then, determining whether the traffic participant is attached to the transportation vehicle may comprise determining whether the message was communicated in response to the request and associating the message to the trailer may comprise associating the message to the trailer if the message was communicated in response to the request. The request via the wired connection may provide that only traffic participants connected physically to the transportation vehicle are enabled to respond to the request. Hence, such request-response identification may provide a more reliable identification of the trailer and may avoid that messages are associated incorrectly, e.g., that a message of traffic participants other than the trailer are associated therewith.

A respective method for such request-response identification may be implemented in a trailer, as stated in more detail later.

In particular, determining whether the message was communicated in response to the request may comprise determining whether the message is indicative of the request and/or whether the message was communicated within a predetermined time period after providing the request. This can further reduce the risk of errors and further increase a reliability of the association and/or identification.

The request, e.g., is indicative of information on the actuation of a control element of the transportation vehicle. Accordingly, determining whether the message is indicative of the request may comprise determining whether the message is indicative of the information on the actuation. The control element, e.g., is a control element for the turn signal of the transportation vehicle and the request, e.g., comprises a signal which indicates which of the right and left turn signal and/or how often the turn signal has been actuated. It is noted that the control element can be also any other control element, e.g., for the hazard warning lights, for a horn, for adjusting exterior mirrors, a gear shift lever, or the like. In this way, a driver or passenger of the transportation vehicle can manually cause the transportation vehicle to associate the message of the trailer with it, e.g., when the driver wants to use the trailer assist system together with the message from the trailer, e.g., for using the sensor data in the message for maneuvering the trailer.

Other exemplary embodiments provide a method for a trailer and for communicating with a transportation vehicle. The method comprises receiving, from the transportation vehicle, a request via a wired connection between the transportation vehicle and the trailer. Further, the method comprises transmitting, to the transportation vehicle, in response to the request a message for determining, by the transportation vehicle, whether the trailer is attached to the transportation vehicle using the message and associating, by the transportation vehicle, the message to the trailer if it is determined that it is attached to the transportation vehicle. As explained above in connection with the method for the transportation vehicle, this allows the transportation vehicle to associate the message to the trailer and may be more secure than other, e.g., position-ad/or motion-based concepts.

In line with the above explanations in connection with the transportation vehicle and the request-response identification, the method may further comprise including in the message information indicating whether the message is transmitted in response to the request, for the message to indicate whether the trailer is attached to the transportation vehicle. The information can be understood as a proof that the trailer received the request and/or as an identifier of the trailer. Thus, the message allows the transportation vehicle to distinguish the message from messages of other traffic participants and to associate the message from the trailer with it.

In some exemplary embodiments, transmitting the message in response to the request comprises transmitting the message within a predetermined time period after receiving the request, for the message to indicate that the message is a response to the request. The predetermined time period is such that the transportation vehicle receives the message while the transportation vehicle expects a response to the request. Such a concept for time-based identification allows a smaller size of the message and, thus, may save resources and costs.

The method may further comprise obtaining information on the environment of the trailer from one or more sensors of the trailer and including the information on the environment in the message, for the transportation vehicle to use the message for a trailer assist system. This allows the trailer assist system to use the information on the environment (observations) of the one or more sensors for maneuvering the trailer (partially) automatically and/or supporting the driver when maneuvering the trailer, e.g., when backing off.

In some exemplary embodiments, the message comprises at least one of a Collective Perception Message, CPM, and a Cooperative Awareness Message, CAM. CPMs and CAMs may be compatible technology of the transportation vehicle for communication with separate transportation vehicles, e.g., protocols, routines, and other methods or mechanisms of the technology. So, the use of the CAM and/or CPM for the message of the transportation vehicle may save additional methods or mechanisms for communication with the trailer.

Other exemplary embodiments provide a computer program having a program code for performing at least one of the methods described herein, when the computer program is executed on a computer, a processor, or a programmable hardware component.

Further exemplary embodiments provide a communication circuit comprising one or more interfaces configured to communicate in a communication network and a data processing circuit which is configured to control the one or more interfaces and to execute one of the methods described herein using the one or more interfaces.

Other exemplary embodiments provide a transportation vehicle or a trailer comprising the communication circuit described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed, or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosed embodiments. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be similarly interpreted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes", or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
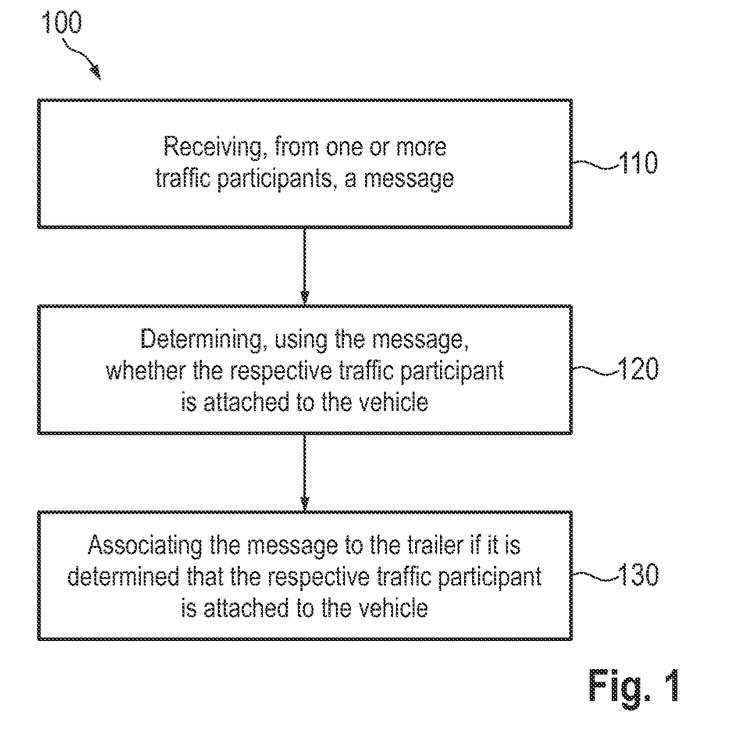
FIG. 1 shows a flow chart schematically illustrating an exemplary embodiment of a method for a transportation vehicle and for communicating with a trailer.

FIG. 1 shows a flow chart schematically illustrating an exemplary embodiment of a method 100 for a transportation vehicle and for communicating with a trailer.

In context of the present disclosure, vehicles, such as the transportation vehicle, can be understood as motor vehicles or power-driven vehicles having a motor for propulsion. The transportation vehicle can be any ground vehicle, a watercraft, or the like. For example, the transportation vehicle is a car, a bus, a truck, or the like. Further, the transportation vehicle may be configured for the use as towing vehicle. So, the transportation vehicle may exhibit methods or mechanisms for towing the trailer, e.g., a coupling device or tow hitch for hitching the trailer to the transportation vehicle. Optionally, the transportation vehicle may also have a socket for supplying the trailer with electric power and signals from the transportation vehicle for lights, e.g., rear lights, brake lights, and/or turn signal lights via a wired connection to the socket.

The trailer can be understood as an unpowered wagon or an object that is configured and/or intended to be towed by a transportation vehicle. So, in difference to the transportation vehicle, disclosed embodiments of the trailer have no propulsion system itself, apart from any auxiliary motors for maneuvering within small ranges (e.g., a few meters or tens of meters). In particular, the trailer can be a utility trailer, a bicycle trailer, a construction trailer, a travel trailer, a semi-trailer, a full trailer, close-coupled trailer, motorcycle trailer, livestock trailer, boat trailer, or the like.

Method 100 comprises receiving 110, from one or more traffic participants, a message. In context of the present disclosure, traffic participants can be understood as any wagon or road user which communicates or is at least configured to communicate in a vehicular communication network, in particular, with the transportation vehicle. The message may correspond to any communication signal. In particular, the transportation vehicle may receive one or more messages from one or more of the traffic participants. In practice, the messages of the traffic participants differ (in their content) and/or may be received at different times. The message/s may comprise a Collective Perception Message (CPM) and/or a Cooperative Awareness Message (CAM).

For receiving the message/s of the traffic participants, wired connections as well as wireless communication technology may be used. In some exemplary embodiments technology configured for communication between separate transportation vehicles is used. In context of the present disclosure, the technology configured for communication between separate transportation vehicles can be understood as technology configured to communication between motor vehicles or power-driven vehicles. In particular, the technology comprises technology of a communication standard (e.g., 802.11p of the Institute of Electrical and Electronics Engineers, IEEE, and/or TS 103 324 of the European Telecommunications Standards Institute, ETSI) for wireless communication between separate transportation vehicles. In context of the present disclosure, such technology is not limited to physical methods or mechanisms or hardware (e.g., receivers, transmitters, transceivers, amplifiers, etc.) but also includes computer programs and software (e.g., protocols, routines, etc.). For example, the technology comprises a vehicular communication system and/or methods or mechanisms for communication using dedicated short-range communications (DSRC), a vehicular ad hoc network (VANET), C-V2X, WLANp, and/or the like for communication between separate transportation vehicles. In exemplary embodiments, the technology comprises, e.g., one or more WLAN interfaces, PC5 interfaces, Uu interfaces, and/or respective processing methods or mechanisms.

In some exemplary embodiments, the technology may be also used for vehicle-to-infrastructure (V2I) and/or vehicle-to-pedestrian (V2P) communication. It is noted that optionally any other communication technology may be used for receiving the message.

Method 100 further comprises determining 120, using the message, whether the respective traffic participant is attached to the transportation vehicle. In other words, it is determined whether the message comes from a trailer attached to the transportation vehicle. A skilled person having benefit from the present disclosure will appreciate that the message may indicate whether the respective traffic participant, the one which has sent the message, is attached to the transportation vehicle, in the sense of mechanically coupled to it for towing. In practice, the message, e.g., indicates by its content and/or time when the message is received by the transportation vehicle whether the respective traffic participant is attached to the transportation vehicle. In exemplary embodiments, the message, e.g., includes adequate information (e.g., one or more bits) indicating that the message comes from a traffic participant attached to the transportation vehicle or not. For this, the message, e.g., includes information indicating whether and/or to which transportation vehicle the respective traffic participant is coupled. For example, the message includes an identifier of the transportation vehicle to which the respective traffic participant is coupled.

Alternatively or additionally, it is determined whether the message comes from a traffic participant attached to the transportation vehicle by determining whether the message is received during a predefined time period in which the transportation vehicle expects a message from such a traffic participant attached to the transportation vehicle, e.g., in response to a request from the transportation vehicle. In exemplary embodiments, the time period, e.g., is a predefined time period after transmitting the request by the transportation vehicle.

For another optional approach, the message may indicate a distance of the respective traffic participant to the transportation vehicle and it is determined by the distance whether the respective traffic participant is attached to the transportation vehicle. The skilled person having benefit from the present disclosure will appreciate that the distance may be determined using a signal strength at the transportation vehicle for communicating the message and/or a latency indicating a travel time of the message from the respective traffic participant to the transportation vehicle. Accordingly, the respective traffic participant may be assumed to be attached to the transportation vehicle if the latency falls short of a predefined threshold for the latency and/or the signal strength is greater than or equal to a predefine threshold for signal strength.

Further, method 100 comprises associating 130 the message to the trailer if it is determined that the respective traffic participant is attached to the transportation vehicle. To do so, the transportation vehicle, e.g., marks the message with a predefined label and/or saves the message in a specific database for messages from the trailer. Thus, the message can be distinguished from messages of other traffic participants for a specific use of messages from the trailer, e.g., for the use in a trailer assist system.

It is noted that the above method may be also applied to a plurality of messages from the traffic participants and multiple messages of a respective traffic participant, e.g., when one traffic participant transmits multiple messages.

The messages from the traffic participants include a respective unique identifier. If so, the transportation vehicle may compare the identifier of the message associated with the trailer with further received messages to identify other messages from the trailer.

In some exemplary embodiments, the message indicates a motion and/or a position of the respective traffic participant. A trailer mechanically attached to the transportation vehicle will follow the transportation vehicle. So, the trailer's motion and position correlate to the motion and position of the transportation vehicle. The trailer, e.g., remains in a predefined distance to the transportation vehicle and/or is constantly positioned behind (to the rear of) the transportation vehicle. Accordingly, it may be determined whether the respective traffic participant is attached to the transportation vehicle based on a comparison of the transportation vehicle's and the traffic participant's motion and/or position using the message. For example, it is determined whether the respective traffic participant is positioned in a predefined distance and/or behind the transportation vehicle and/or whether the motion of the respective traffic participant correlates with the motion of the transportation vehicle, for example, whether the motion of the respective traffic participant follows the motion of the transportation vehicle (e.g., whether the traffic participant turns right when the transportation vehicle turns right). If so, it may be assumed that the respective traffic participant is a trailer and attached to the transportation vehicle, and the respective message is associated to the trailer. The skilled person will appreciate that the motion and/or the position of the traffic participant allow/s a more reliable identification than, e.g., solely distance- or time-based concept for identification.

Alternatively or additionally, a time-based concept for identification may be applied. For this, method 100 further comprises providing the trailer with a request via a wired connection between the transportation vehicle and the trailer and determining 120 whether the traffic participant is attached to the transportation vehicle comprises determining whether the message was communicated in response to the request. Accordingly, the message is associated to the trailer if the message was communicated in response to the request.

The request can comprise any communication from the transportation vehicle via the wired connection. The wired connection can comprise or correspond to any conducting connection, e.g., a wired connection for coupling a trailer to the transportation vehicle. In exemplary embodiments, the wired connection, e.g., comprises a wired connection for actuating light signals of the trailer (e.g., turn signals, hazard lights, etc.). In other exemplary embodiments, also other wired connections may be used. Trailers are usually only electrically coupled to a transportation vehicle when they are also mechanically attached to it. So, communication via the wired connection allows to make sure that the request is only received by the trailer (traffic participant) if it is attached to the transportation vehicle. Hence, the trailer (traffic participant) can only respond to the request if it is attached to the transportation vehicle. Accordingly, the message may indicate that the respective traffic participant is attached to the transportation vehicle if it was communicated in response to the request. The skilled person will appreciate that there are several options to indicate and determine whether the message was communicated in response.

One option is, to provide that the message is communicated or received by the transportation vehicle within a predefined time period, e.g., when the transportation vehicle expects a response to the request and to determine whether the messages is received during the time period to determine whether the respective traffic participant is attached to the transportation vehicle. To coordinate how it is indicated and determined that the message is a response to the request, a respective protocol may be provided to the transportation vehicle and/or the trailer.

Another option is, to provide that the message is indicative of the request and to determine whether the message is indicative of the request to determine whether the respective traffic participant is attached to the transportation vehicle. To do so, information on the request may be included in the message. In exemplary embodiments in which the message has a standardized message format (e.g., for Collective Perception Messages and/or Cooperative Awareness Messages), such information may be included in a specific portion specifically intended in the standard (in accordance with the respective standard, e.g., TS 103 324 or TR 103 562 from the European Telecommunications Standards Institute, ETSI). The portion, e.g., is a specific data item/field in the message.

If the message is indicative of the request it may be unambiguously differentiated from messages of other traffic participants even if multiple messages from multiple traffic participants have been received when the transportation vehicle expected a response to the request.

In exemplary embodiments, the request is indicative of information on the actuation of a control element of the transportation vehicle and it is determined whether the message is indicative of the information on the actuation for determining whether the message is indicative of the request. The control element can be any component configured to trigger that a signal is communicated via the wired connection when the control element is actuated. In practice, signals for activating turn signals or hazard lights are communicated via the wired connection. Accordingly, the control element may comprise a control element for actuating a turn signal or hazard lights. In exemplary embodiments, the information may indicate when or how often the control element is or has been actuated. So, the information, e.g., is indicative of a number which indicates how often the right turn signal has been actuated (within a predefined time period). In turn, the trailer may receive this information together with the request and incorporate the information into the message in response to the request to prove receipt of the request and, thus, that the trailer is attached to the transportation vehicle.

It is noted that both options for such a reaction-based concept for identification may be applied separately or in combination.

Figure 2:
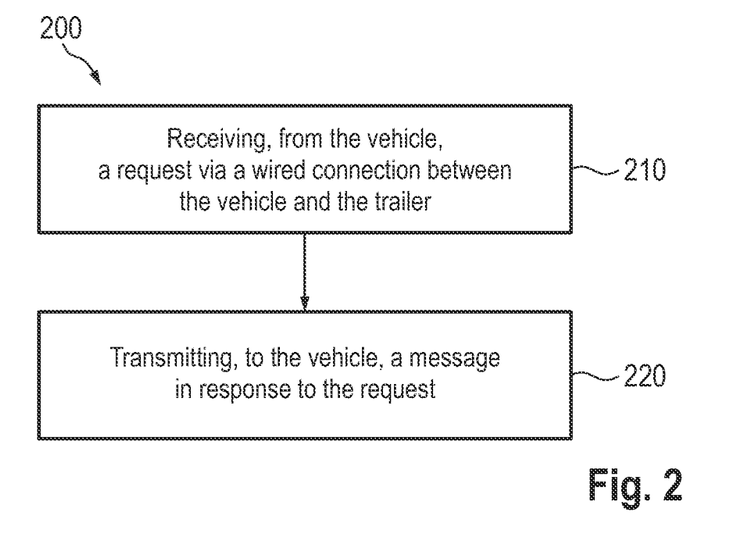
FIG. 2 shows a flow chart schematically illustrating an exemplary embodiment of a method for a trailer and for communicating with a transportation vehicle.

The aforementioned concept for identification may be also implemented in a respective method for a trailer (and vice versa), as shown in FIG. 2. It is noted that explanations in connection with method 100 also apply to the respective method for the trailer and vice versa.

FIG. 2 shows a flow chart schematically illustrating an exemplary embodiment of a method 200 for a trailer and for communicating with a transportation vehicle.

Method 200 comprises receiving 210, from the transportation vehicle, a request via a wired connection between the transportation vehicle and the trailer and transmitting 220, in response to the request, a message to the transportation vehicle to enable the transportation vehicle to determine whether the trailer is attached to the transportation vehicle using the message and, if so, to associate the message to the trailer.

As mentioned previously, one idea is that the request is only transmitted from the transportation vehicle via the wired connection and, thus, the trailer can only receive the request via the wired connection when it is hitched, i.e., mechanically attached to the transportation vehicle for towing.

The skilled person will appreciate that there are several options to implement method 200, in particular, multiple options to prove through the message that the trailer is attached to the transportation vehicle.

According to one option, method 200 further comprises including in the message information indicating whether the message is transmitted in response to the request so that the message indicates whether the trailer is attached to the transportation vehicle. To do so, the information, e.g., is indicative of the request or when the request was received so that the transportation vehicle can compare the information with the request or to compare times when the request has been transmitted by the transportation vehicle and received by the trailer for determining whether the message has been communicated in response to the request. In doing so, the transportation vehicle, e.g., determines that the trailer is attached to the transportation vehicle if the information in the message is indicative of the request and/or a delay between the times falls short of a predefined threshold.

Another option is that the trailer transmits the message to the transportation vehicle within a predetermined time period after receiving the request. The predetermined time period, e.g., is a time period during which the transportation vehicle expects to receive a response to the request by the trailer. Accordingly, the transportation vehicle may associate the message with the trailer if the message is received during this time period.

Method 200, e.g., is applied for the use with a trailer assist system of the transportation vehicle and for identification of messages from the trailer for such use. In exemplary embodiments for such use cases, method 200 may further comprise obtaining information on the environment of the trailer from one or more sensors of the trailer and including the information on the environment in the message. This enables the transportation vehicle to associate information on the environment with the trailer and to purposefully use the information on the environment from the trailer for the trailer assist system, e.g., for providing the trailer assist system with the information on the environment for maneuvering the trailer (at least partially) automatically and/or more safely. The information on the environment, e.g., includes sensor data of one or more environmental sensors (e.g., lidar sensors, radar sensors, cameras, ultrasonic sensors, etc.) of the trailer.

The proposed methods may be implemented in a communication circuit for a transportation vehicle and/or a trailer, respectively.

Figure 3:
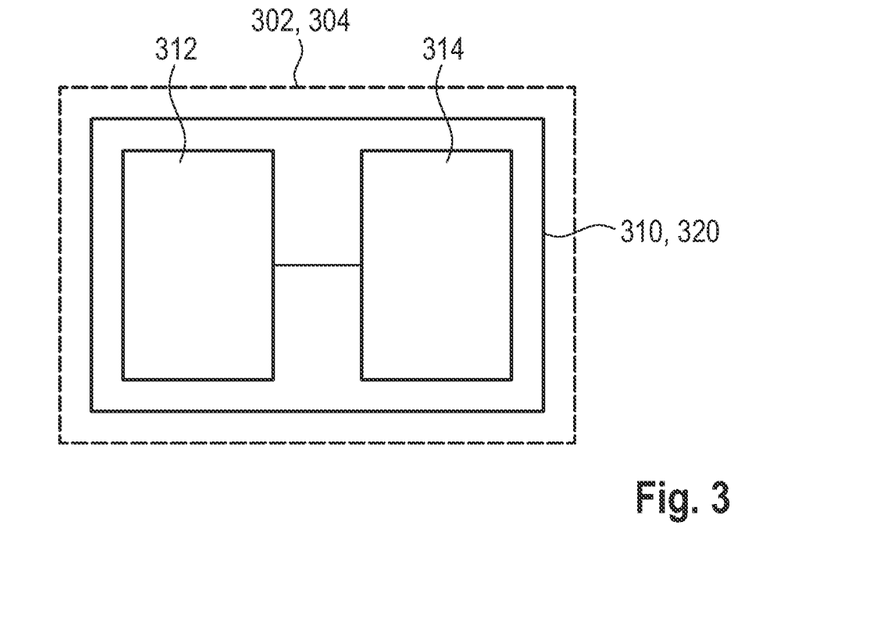
FIG. 3 shows a block diagram schematically illustrating an exemplary embodiment of a communication circuit for a transportation vehicle/trailer.

FIG. 3 shows a block diagram schematically illustrating an exemplary embodiment of a communication circuit 310 for a transportation vehicle 302 and a communication circuit 320 for a trailer 304, respectively.

The communication circuit 310/320 comprises one or more interfaces 312 configured to communicate in a communication network and a data processing circuit 314 which is configured to control the one or more interfaces 312 and to execute the proposed method for the transportation vehicle or the trailer, respectively, using the one or more interfaces 312. So, communication circuit 310, e.g., is configured to execute method 100 and communication circuit 320 is configured to execute method 200.

In exemplary embodiments the one or more interfaces 312 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 312 may comprise further components to enable communication between transportation vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 312 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc.

As shown in FIG. 3 the respective one or more interfaces 312 are coupled to the respective data processing circuit 314 of the communication circuit 310 or 320, respectively. In exemplary embodiments, the data processing circuit 314 may comprise any method or mechanism for processing information according to the respective method described herein. The data processing circuit 314 may be implemented using one or more processing units, one or more processing devices, any method or mechanism for processing, such as a processor, a computer or a programmable hardware component being operable with accordingly adapted software. In other words, the described functions of the data processing circuit 314 may as well be implemented in software, which is then executed on one or more programmable hardware components. Such hardware components may comprise a general-purpose processor, a Digital Signal Processor (DSP), a micro-controller, etc.

Figure 4:
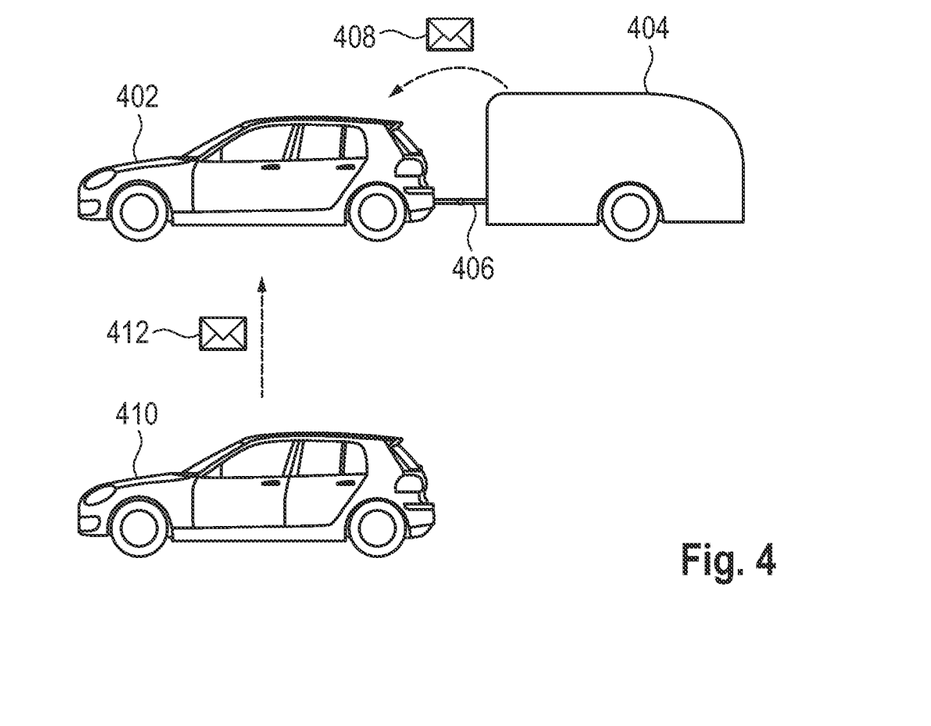
FIG. 4 shows a block diagram illustrating a use case of the disclosed concept.

Properties and features of the proposed concept should be illustrated in more detail with reference to FIG. 4 which shows a block diagram illustrating an exemplary use case of the proposed concept. In particular, FIG. 4 shows a use case of the proposed concept in for a trailer assist system.

The block diagram illustrates a first transportation vehicle 402, a second transportation vehicle 410, and a trailer 404 attached to the first transportation vehicle 402.

The first transportation vehicle 402 is configured for communication with transportation vehicle 410 and trailer 404. So, in practice, transportation vehicle 402 receives a message 408 from trailer 404 and a message 412 from transportation vehicle 410 (indicated by dashed arrows). Optionally, transportation vehicle 402 uses the same technology, e.g., same communication components from communication with transportation vehicle 410 and trailer 404 to save resources (e.g., additional party, costs, energy, etc.). Message 408 as well as message 412, e.g., comprises or corresponds to a CPM.

In some cases, e.g., when it is desired to specifically or exclusively use messages from trailer 404, e.g., for a trailer assist system of transportation vehicle 402, it is a demand to differentiate between CPM 408 and CPM 412.

To do so, one approach is that transportation vehicle 402 uses information on the position and/or motion of trailer 404 and transportation vehicle 410 which is included in CPM 408 and CPM 412, respectively, according to the standard of CPM (e.g., TS 103 324 or TR 103 562 from the European Telecommunications Standards Institute, ETSI). In doing so, the transportation vehicle 402 may determine whether the motion and/or position indicated by the CPMs 408 and 412 correlates to the motion and/or position of transportation vehicle 402 as expected of trailers attached to transportation vehicle 402. For example, it is determined whether the sender, i.e., trailer 404 and transportation vehicle 410, remains in a predefined distance to the transportation vehicle and/or is constantly positioned behind (to the rear of) transportation vehicle 302. For trailer 404, that might be true, while it is not for transportation vehicle 410. Accordingly, it is determined that CPM 408 comes from a trailer attached to transportation vehicle 402 and CPM 412 does not.

According to another approach, a reaction-based identification mechanism is deployed which provides that transportation vehicle 402 provides a request via a wired interface 406 for trailers such that only trailers attached to transportation vehicle 402 receive the request via a wired connection to interface 406 and that transportation vehicle 402 identifies the trailer based on its reaction on the request. The reaction, e.g., comprises transmitting CPM 408 to transportation vehicle 402. So, for identification, transportation vehicle 402, e.g., determines whether CPM 408 is a reaction to the request via interface 406. The skilled person will appreciate that there are several ways to do that.

One includes a time-based approach. This, e.g., provides that transportation vehicle 402 determines whether the CPM 408 was communicated within a predetermined time period, e.g., a predetermined time period after transmitting the request to check CPM 408 for a temporal correlation to the request for identification. The predetermined time period, e.g., is 3 seconds or another (shorter or longer) time period after transmitting the request. In the example of FIG. 4, CPM 408, e.g., transportation vehicle 402 receives the CPM 408 within the predetermined time period and, thus, confirms the temporal correlation and determines that CPM 408 comes from an attached (attached to transportation vehicle 402) trailer. On the contrary, CPM 412, e.g., is received more than the predetermined time period after transmitting the request. So, since there is no temporal correlation for CPM 412, it is determined that 412 does not come from an attached trailer.

Another way of identification provides that the request is a distinct one, e.g., has a distinct signature and that it is determined whether CPM 408 is indicative of the request and the distinct signature, respectively. The request or its signature, e.g., is indicates an actuation of a control element of transportation vehicle 402. In particular, the request may be indicative of an actuation for instructions to a trailer attached to transportation vehicle 402 via interface 406, e.g., instructions to switch on turn signals, brake lights, and/or rear (fog) lights. In some exemplary embodiments, the request may be also indicative of a distinct code, e.g., a distinct "turn-on-sequence" (e.g., "switch on left turn signals once and right turn signals twice", or the like). Accordingly, CPM 408 may be indicative of the request, e.g., CPM 408 indicates the distinct turn-on-sequence and, if so, transportation vehicle 402 may determine that CPM 408 comes from an attached trailer. For this, information on the request (e.g., information on the turn-on-sequence or any other distinct signature) may be included in CPM 408, e.g., in a respective portion intended for such information. By contrast, transportation vehicle 410 does not receive the request, so, CPM 412 is not indicative thereof, and, thus, determined as not from an attached trailer.

Additionally, the CPMs 408 and 412 may include information on a class/type (e.g., on a transportation vehicle class/type) of its sender and transportation vehicle 402 may additionally use such information for identification of an attached trailer in received messages. Such information, e.g., indicates that the respective CPM comes from a "passenger car", a "bus", or a "trailer" and transportation vehicle 402 identifies the CPM from the attached trailer, here CPM 408, additionally using that information. E.g., only if the CPM indicates that the respective sender is a trailer, it is considered or it comes into consideration that it is from an attached trailer.

So, in the example of FIG. 4, transportation vehicle 402 may identify CPM 408 as message from an attached trailer, here trailer 404. Further, transportation vehicle 402 may mark CPM 408 as message from an attached trailer, e.g., by saving CPM 408 in a specific database or by tagging CPM 408 with a specific mark.

It is noted that the approaches described herein may be implemented solely or in combination.

It is further noted that, although the above explanations herein are made with reference to a specific traffic scenario and in connection with CPMs, also other messages (e.g., CAM) may be used and that the above explanations also apply to other messages and other traffic scenarios (e.g., including more or less other traffic participants in the environment of transportation vehicle 402).

The proposed concept allows to differentiate messages of trailers attached to transportation vehicle 402 for "trailer-specific uses". E.g., the CPMs 408 and 412 comprise information on or sensor data of the environment and, using the concept, it is determined that CPM 408 comes from a trailer attached to transportation vehicle 402 (and CPM 412 not) to specifically use the information on the environment from CPM 408 for a trailer assist system, e.g., to maneuver the transportation vehicle 402 and trailer 404 (automatically) based on the information. Also, other uses may be envisaged.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 100 method for a transportation vehicle
110 receiving, from one or more traffic participants, a message
120 determining, using the message, whether the respective traffic participant is attached to the transportation vehicle
130 associating the message to the trailer if it is determined that the respective traffic participant is attached to the transportation vehicle
200 method for a trailer
210 receiving, from the transportation vehicle, a request via a wired connection between the transportation vehicle and the trailer
220 transmitting, to the transportation vehicle, a message in response to the request
302 transportation vehicle
304 trailer
310 communication circuit for a transportation vehicle
320 communication circuit for a trailer
312 one or more interfaces
314 data processing circuitry
402 transportation vehicle
404 trailer
406 wired interface
408 message/CPM
410 transportation vehicle
412 message/CPM

The invention claimed is:
1. A communication circuit comprising:
one or more interfaces to communicate in a communication network; and
a data processing circuit to control the one or more interfaces,
wherein the data processing circuit is configured to perform a method for a transportation vehicle and for communicating with a trailer via the one or more interfaces, the method comprising:
receiving a message from one or more traffic participants;

determining whether the respective traffic participant is attached to the transportation vehicle based on the message; and associating the message to the trailer in response to determining that the respective traffic participant is attached to the transportation vehicle, wherein the message indicates a motion and/or a position of the respective traffic participant, wherein determining whether the traffic participant is attached to the transportation vehicle comprises determining whether the respective traffic participant is attached to the transportation vehicle based on a comparison of the motion and/or position of the transportation vehicle and the traffic participant using the message, wherein the trailer is provided with a request via a wired connection between the transportation vehicle and the trailer, wherein determination of whether the traffic participant is attached to the transportation vehicle comprises determination of whether the message was communicated in response to the request, and wherein association the message to the trailer comprises associating the message to the trailer in response to the message being communicated in response to the request.

2. The communication circuit of claim 1, wherein the message associated with the trailer is used for a trailer assist system of the transportation vehicle.

3. The communication circuit of claim 1, wherein determination whether the message was communicated in response to the request comprises determination of whether the message is indicative of the request and/or whether the message was communicated within a predetermined time period after providing the request.

4. The communication circuit of claim 3, wherein the request is indicative of information on the actuation of a control element of the transportation vehicle, and wherein determining whether the message is indicative of the request comprises determining whether the message is indicative of the information on the actuation.

5. A transportation vehicle comprising a communication circuit comprising:
   one or more interfaces to communicate in a communication network; and
   a data processing circuit to control the one or more interfaces,
   wherein the data processing circuit is configured to perform a method for a transportation vehicle and for communicating with a trailer via the one or more interfaces, the method comprising:
   receiving a message from one or more traffic participants;
   determining whether the respective traffic participant is attached to the transportation vehicle based on the message; and
   associating the message to the trailer in response to determining that the respective traffic participant is attached to the transportation vehicle,
   wherein the message indicates a motion and/or a position of the respective traffic participant,
   wherein determining whether the traffic participant is attached to the transportation vehicle comprises determining whether the respective traffic participant is attached to the transportation vehicle based on a comparison of the motion and/or position of the transportation vehicle and the traffic participant using the message,
   wherein the trailer is provided with a request via a wired connection between the transportation vehicle and the trailer,
   wherein determination of whether the traffic participant is attached to the transportation vehicle comprises determination of whether the message was communicated in response to the request, and
   wherein association the message to the trailer comprises associating the message to the trailer in response to the message being communicated in response to the request.

6. A method for a transportation vehicle and for communicating with a trailer, the method comprising:
   receiving a message from one or more traffic participants;
   determining whether the respective traffic participant is attached to the transportation vehicle based on the message;
   associating the message to the trailer in response to determining that the respective traffic participant is attached to the transportation vehicle, wherein the message indicates a motion and/or a position of the respective traffic participant, wherein determining whether the traffic participant is attached to the transportation vehicle comprises determining whether the respective traffic participant is attached to the transportation vehicle based on a comparison of the motion and/or position of the transportation vehicle and the traffic participant using the message; and
   providing the trailer with a request via a wired connection between the transportation vehicle and the trailer, wherein determining whether the traffic participant is attached to the transportation vehicle comprises determining whether the message was communicated in response to the request, and wherein associating the message to the trailer comprises associating the message to the trailer in response to the message being communicated in response to the request.

7. The method of claim 6, further comprising using the message associated with the trailer for a trailer assist system of the transportation vehicle.

8. The method of claim 6, wherein determining whether the message was communicated in response to the request comprises determining whether the message is indicative of the request and/or whether the message was communicated within a predetermined time period after providing the request.

9. The method of claim 8, wherein the request is indicative of information on the actuation of a control element of the transportation vehicle, and wherein determining whether the message is indicative of the request comprises determining whether the message is indicative of the information on the actuation.

10. A non-transitory computer readable medium including a computer program having a program code for performing the method of claim 6, when the computer program is executed on a computer, a processor, or a programmable hardware component.

* * * * *